(12) United States Patent
Rumpf et al.

(10) Patent No.: US 8,953,247 B2
(45) Date of Patent: Feb. 10, 2015

(54) POSITIONING SYSTEM FOR HEAD-UP DISPLAY

(75) Inventors: Horst Rumpf, Wetzlar (DE); Christian Hopf, Wetzlar (DE); Alexander Noel, Wetzlar (DE)

(73) Assignee: Lite-On Technology Corporation, Taipei (TW)

( * ) Notice: Subject to any disclaimer, the term of this patent is extended or adjusted under 35 U.S.C. 154(b) by 92 days.

(21) Appl. No.: 13/010,536

(22) Filed: Jan. 20, 2011

(65) Prior Publication Data

US 2012/0188650 A1    Jul. 26, 2012

(51) Int. Cl.
*G02B 27/14* (2006.01)
*G09G 5/00* (2006.01)
*G02B 7/00* (2006.01)
*G02B 27/01* (2006.01)

(52) U.S. Cl.
CPC ............ *G02B 7/005* (2013.01); *G02B 27/0149* (2013.01); *G02B 2027/0156* (2013.01)
USPC ................................ 359/632; 345/7; 359/630

(58) Field of Classification Search
USPC .................................. 359/634, 630, 631, 632
See application file for complete search history.

(56) References Cited

U.S. PATENT DOCUMENTS 7,869,129 B2 * 1/2011 Lebreton ....................... 359/632
2009/0086329 A1 4/2009 Potakowskyj et al.

* cited by examiner

*Primary Examiner* — Jack Dinh
(74) *Attorney, Agent, or Firm* — Muncy, Geissler, Olds & Lowe, P.C.

(57) ABSTRACT

The invention relates to a positioning system for a head-up display which comprises a combiner carrier being moved between a first position and a second position; a combiner rotatbly disposed on the combiner carrier and a tilt angle of the combiner being adjusted; and a driving mechanism for alternatively driving the movement of the combiner and the tilt angle adjustment of the combiner.

11 Claims, 15 Drawing Sheets

POSITIONING SYSTEM FOR HEAD-UP DISPLAY

FIELD OF THE INVENTION

The invention relates to a positioning system for a head-up display, and more particularly to a positioning system for moving and angle adjusting a combiner used in head-up display.

BACKGROUND OF THE INVENTION

A Head-Up Display (HUD) is any transparent display that presents data without requiring users to look away from their usual viewpoints. Although they were initially developed for military aviation, HUDs are now used in commercial aircraft, automobiles, and other applications. Typically, a HUD system mainly includes a combiner, a projector, and a video data source such as a computer. The combiner is a semi-transparent mirror that is positioned in front of the driver/pilot to display the virtual picture with the required information projected from the projector. In operation, the combiner can be moved between a parking position when not needed and an operating position when needed. The movement of the combiner between the parking position and the operating position is realized by means of a HUD positioning system. A second function for angular fine adjustment of the combiner is also implemented in such a positioning system for correcting the tilt angle of the combiner depending on driver's height and his eye position.

For example, US2009/0086329A1 disclosed a positioning system for a combiner in a head-up display. In this art, the combiner is moved from a protected parking position to an operating position by a screw spindle coupled to a stepping motor. The movement is guided by side walls with cams and teeth to drive a synchronous movement. It includes the possibility for angular adjustment of combiner position when reaching the operating position. However, the required space for such a positioning system including many parts for accurate movement limits the possibilities for reducing the size of the HUD system. Besides, the design does not offer the wished flexibility to follow requirements for dashboard and different windshields from car makers. Additionally, the two major functions, i.e. the combiner movement and the combiner adjustment, are strongly linked with each other so that the design of the mechanism of the combiner movement and combiner adjustment is unchangeable.

SUMMARY OF THE INVENTION

Accordingly, the invention provides a positioning system for a head-up display that a moving mechanism and an angle adjusting mechanism are provided as compact separate units and can be handled and optimized independent from specific application due to its modular design.

According to one aspect of the present invention, a positioning system for a head-up display is provided to comprise a combiner carrier being moved between a first position and a second position; a combiner rotatbly disposed on the combiner carrier and a tilt angle of the combiner being adjusted; and a driving mechanism for alternatively driving the movement of the combiner and the tilt angle adjustment of the combiner.

According to another aspect of the present invention, a positioning system for a head-up display is provided to comprise a combiner carrier moveably disposed in a housing; a combiner rotatably disposed on the combiner carrier; a moving mechanism for moving the combiner carrier from a first position to a second position; an angle adjusting mechanism for adjusting a tilt angle of the combiner; and a driving mechanism for alternatively driving the moving mechanism and the angle adjusting mechanism.

BRIEF DESCRIPTION OF THE INVENTION

The present invention can be more fully understood by reference to the following description and accompanying drawings, in which.

DETAILED DESCRIPTION OF THE INVENTION

According to the objects mentioned above, preferred embodiments are brought up to explain the technological means adopted in the present invention and the effect thereof accompanying the attached figures.

Figure 1:
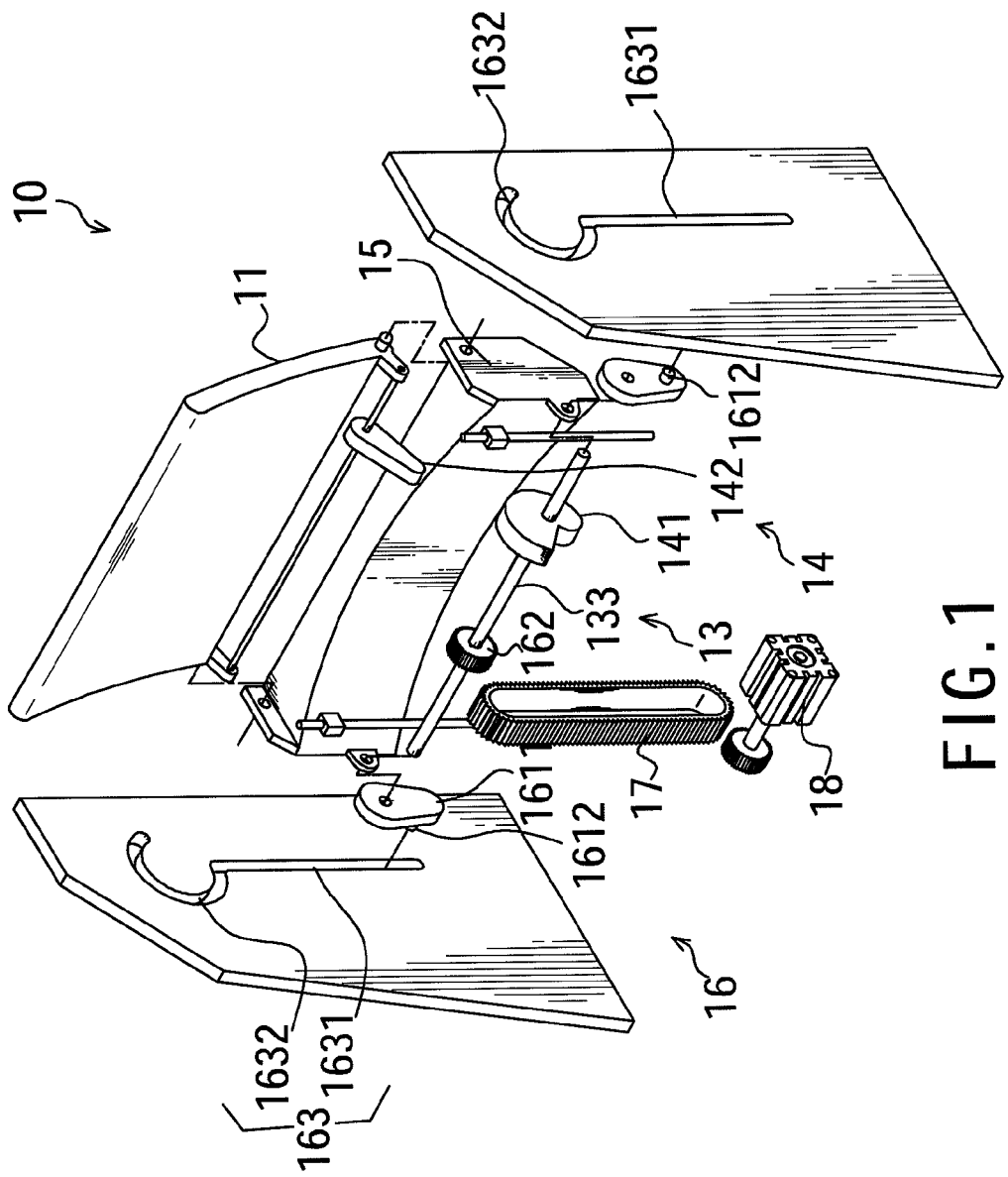
FIG. 1 is an explosion view of a first embodiment of a positioning system for a head-up display of the present invention.

Please refer to FIG. 1. FIG. 1 illustrates a first embodiment of a positioning system for a head-up display of the present invention.

As shown in FIG. 1, the present positioning system 10 for a head-up display comprises a combiner carrier 15; a combiner 11 rotatably disposed on the combiner carrier 15; a moving mechanism 13 for moving the combiner carrier 15 between a parking position and an operating position; an angle adjusting mechanism 14 for adjusting a tilt angle of the combiner 11; and a driving mechanism 16 for alternatively driving the moving mechanism 13 and the angle adjusting mechanism 14.

The moving mechanism 13 comprises a spindle 133 which is rotatably disposed on the combiner carrier 15. The driving mechanism 16 comprises driving gear 162, a guiding slot 163 and a guiding plate 1611. The driving gear 162 and the guiding plate 1611 are disposed on the spindle 133 and are capable of rotating together with the spindle 133. The guiding plate 1611 has a guiding pin 1612 which is accommodated in the guiding slot 163. The driving gear 162 is engaged with an endless gear belt 17. The endless gear belt 17 is driven by a motor 18 and, accordingly, drives the driving gear 162 to rotate or to move. The guiding slot 163 comprises a straight slot 1631 and a curve slot 1632 for switching the motion types of the driving gear 162.

The angle adjusting mechanism 14 comprises a cam 141 and a lever 142. The cam 141 is disposed on the spindle 133 and is capable of rotating together with the spindle 133. One end of the lever 142 is fixed on the combiner 11 and the other end is a free end which is pushed by the cam 141 while the cam 141 rotates. When the cam 141 is rotated together with the spindle 133, the cam 141 pushes the free end of the lever 142 to rotate the combiner 11 for adjusting the tilt angle of the combiner 11.

When the guiding pin 1612 is in the straight slot 1631, the rotation of the guiding plate 1611, the spindle 133 and the driving gear 162 is prohibited by the constraint between the guiding pin 1612 and the straight slot 1631. In this case, when the driving gear 162 is driven by the motor 18 through the endless gear belt 17, the driving gear 162 drives the spindle 133 to move together, therefore, to move the combiner carrier 15 between the parking position and the operating position.

When the guiding pin 1612 is in the curve slot 1632, the rotation of the guiding plate 1611, the spindle 133 and the driving gear 162 is released. In this case, when the driving gear 162 is driven by the motor 18 through the endless gear belt 17, the driving gear 162 drives the cam 141 to rotate together, therefore, to adjust the tilt angle of the combiner 11.

Figure 2:
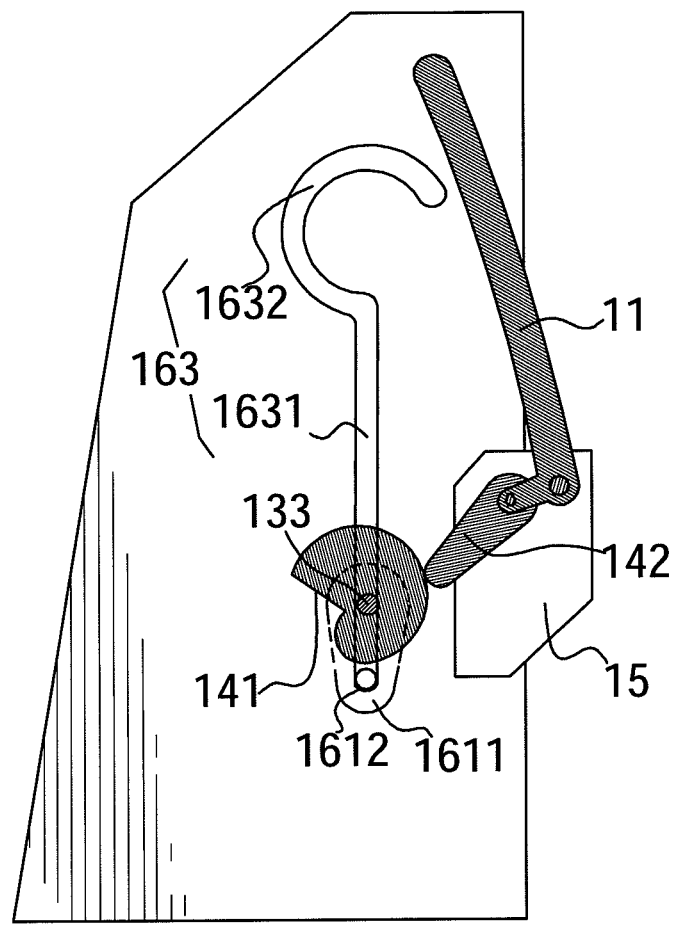
FIG. 2 is a side cross-section view of the positioning system in FIG. 1 wherein a combiner carrier is at a parking position.
Figure 3:
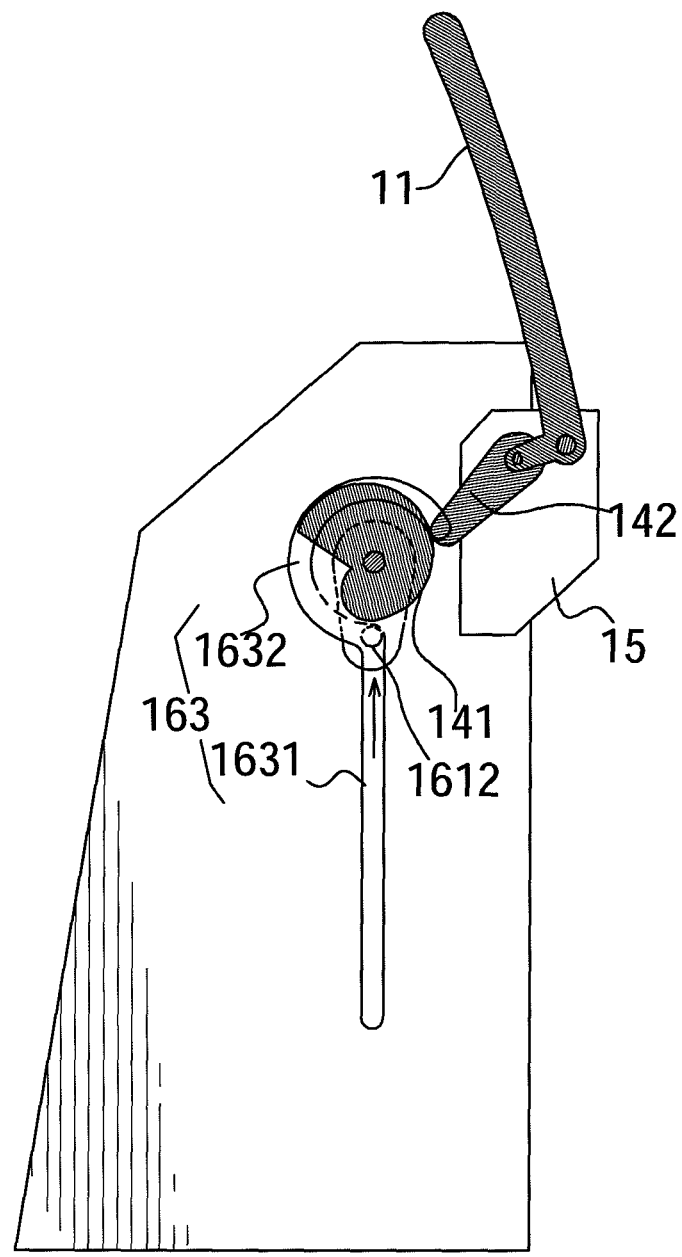
FIG. 3 is a side cross-section view of the positioning system in FIG. 1 wherein the combiner carrier is at an operating position.
Figure 4:
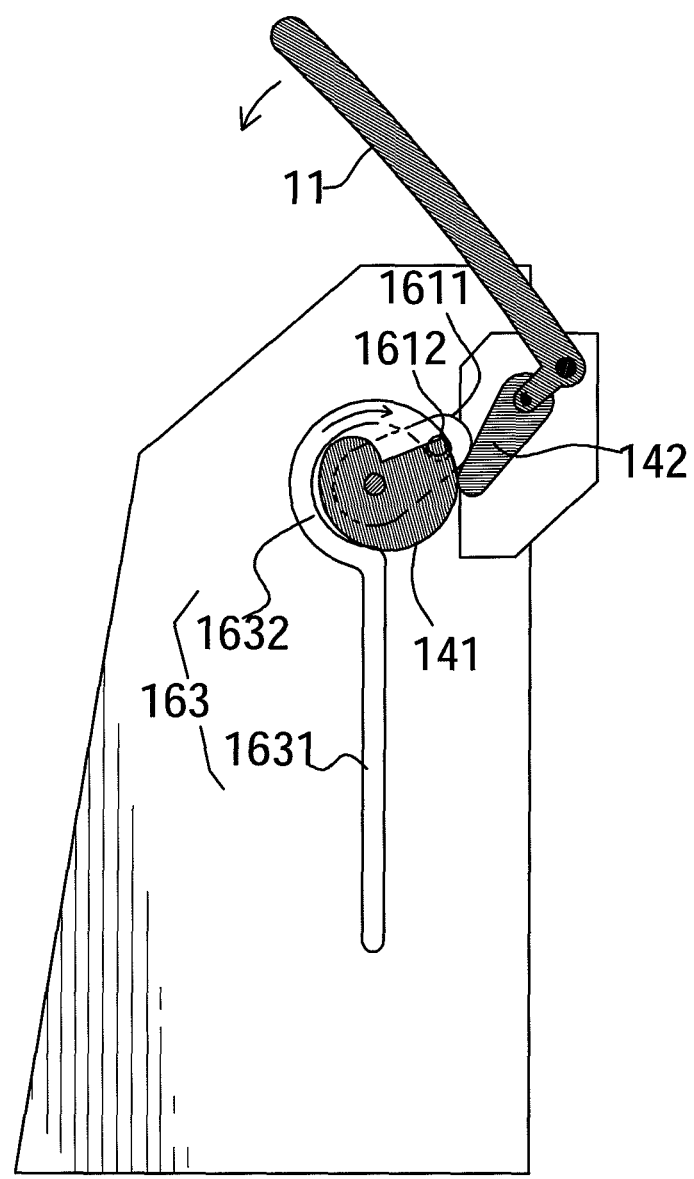
FIG. 4 is a side cross-section view of the positioning system in FIG. 1 wherein the tilt angle of a combiner is adjusted.

Please refer to FIGS. 1 to 4. FIGS. 2 to 4 are side cross-section views of the positioning system in FIG. 1 to respectively show that a combiner carrier is at a parking position, the combiner carrier is at an operating position, and the tilt angle of a combiner is adjusted.

The detailed description of the operation of the positioning system is described as follow.

Before starting to operate the positioning system 10, the combiner carrier 15 is positioned at the parking position, and the guiding pin 1612 is positioned at an end position of the straight slot 1631 as shown in FIG. 2.

At that time, the rotation of the driving gear 162 is prohibited by the constraint between the guiding pin 1612 and the straight slot 1631. When starting to operate the positioning system 10, the endless gear belt 17 is driven by the motor 18 and simultaneously drives the driving gear 162 to move.

During above operation, the driving gear 162 drives the spindle 133 to move together, therefore, the combiner carrier 15 is moved from the sparking position to the operating position, and the guiding pin 1612 is moved in the straight slot 1631 from the end position to a boundary position between the straight slot 1631 and the curve slot 1632 as shown in FIG. 3.

Now please refer to FIG. 3. When the combiner carrier 15 moves to the operating position, the rotation of the driving gear 162 is released because the guiding pin 1612 can move in the curve slot 1632 with the rotation of the driving gear 162.

Accordingly, when the motor 18 keeps driving the driving gear 162, the cam 141 is driven to rotate together, and the cam 141 will contact and push the lever 142 as shown in FIG. 4. Due to the varying radius of the cam 141, the cam 141 pushes the lever 142 at varying distance to rotate the combiner 11, thereby, it could control the tilt angle of the combiner 11 at a suitable view angle for a viewer.

And then, if a user intends to move the combiner carrier 15 back to the parking position, the entire process is reverse by reversing the motor 18. First, the driving gear 162 is driven to reversely rotate until the guiding pin 1612 moves back to the boundary position between the straight slot 1631 and the curve slot 1632 as shown in FIG. 3. Then, the further rotation of the driving gear 162 is prohibited so that the driving gear 162 is driven to move to carry the combiner carrier 15 back to the parking position as shown in FIG. 2.

By the way, for recovering the lever 142 to its un-pushed position after releasing the pushing force from the cam 141, an elastic member such as a spring (not shown in the Figures) is provided on the lever 142 for providing an elastic force against the pushing force from the cam 141.

Figure 5:
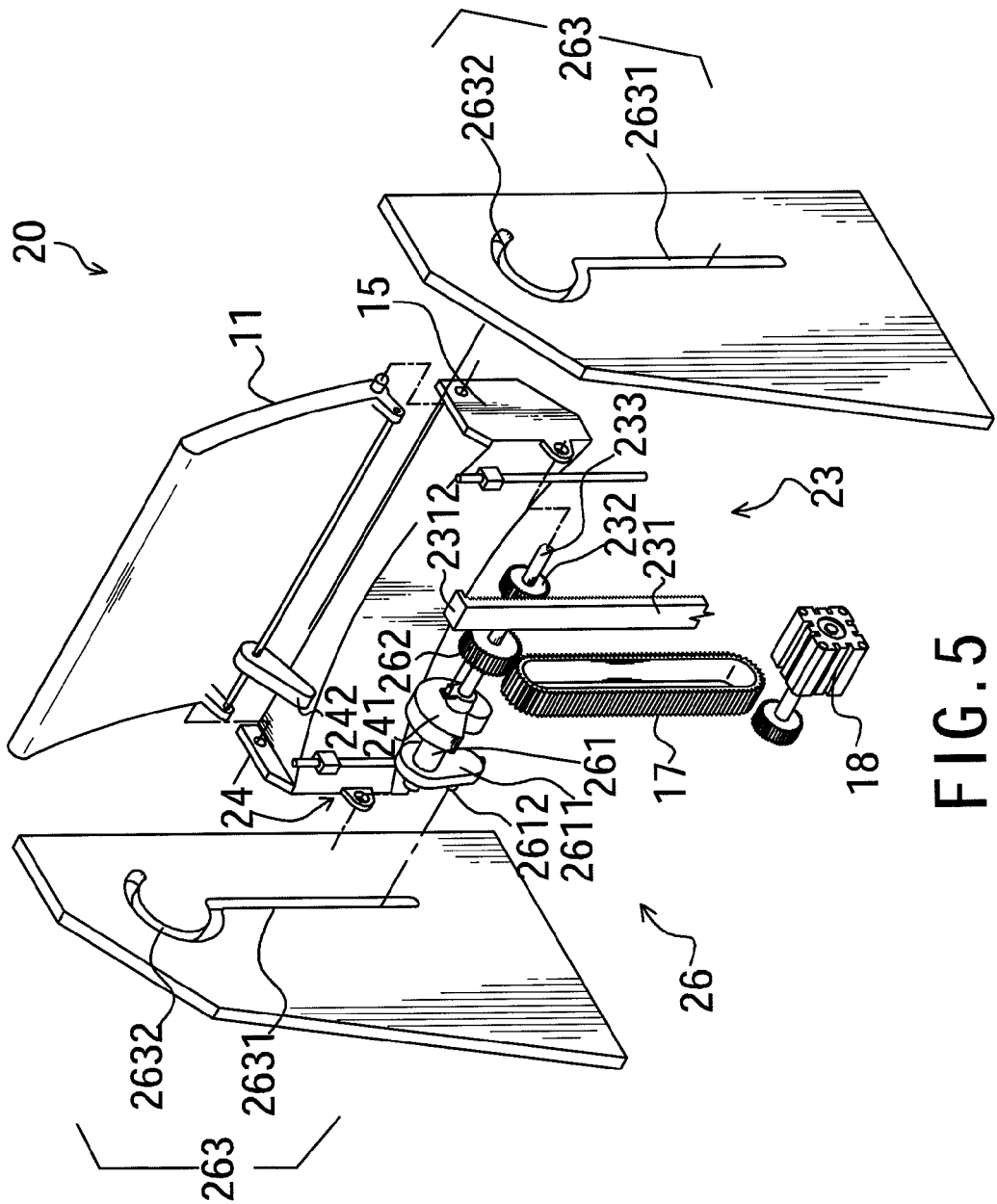
FIG. 5 is an explosion view of a second embodiment of a positioning system for a head-up display of the present invention.
Figure 6:
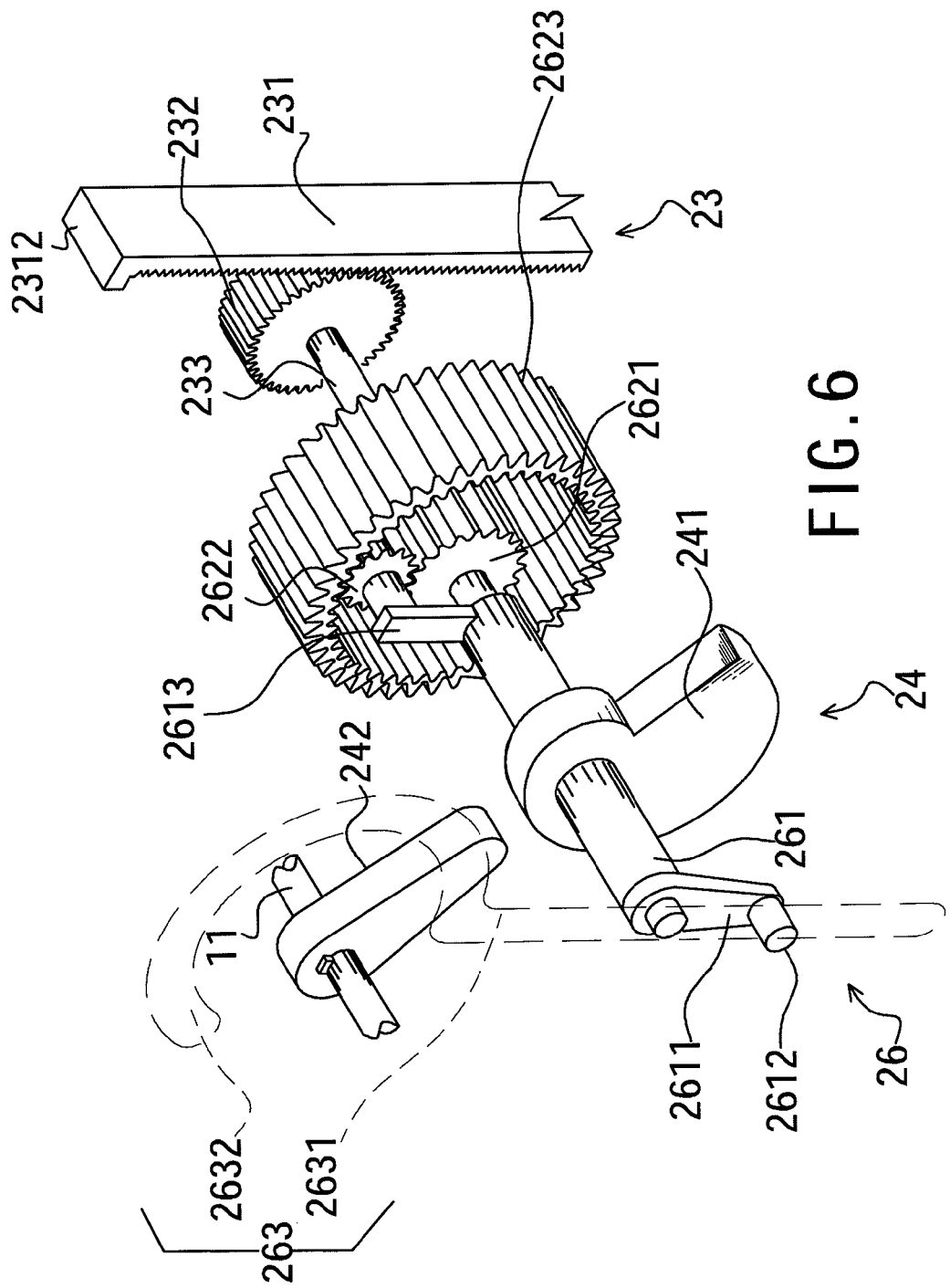
FIG. 6 is an enlarged view of a moving mechanism, a driving mechanism, and an angle adjusting mechanism in the positioning system in FIG. 5.

Please refer to FIG. 5 and FIG. 6. FIG. 5 illustrates a second embodiment of a positioning system for a head-up display of the present invention, and FIG. 6 is an enlarged view of a moving mechanism, a driving mechanism, and an angle adjusting mechanism in the positioning system in FIG. 5. In this embodiment, an alternative moving mechanism 23 and an alternative driving mechanism 26 are provided. The other members are the same as those illustrated in the first embodiment and are numbered with the same number.

As shown in FIG. 5, the present positioning system 20 for a head-up display comprises a combiner carrier 15; a combiner 11 rotatably disposed on the combiner carrier 15; a moving mechanism 23 for moving the combiner carrier 15 between a parking position and an operating position; an angle adjusting mechanism 24 for adjusting a tilt angle of the combiner 11; and a driving mechanism 26 for alternatively driving the moving mechanism 23 and the angle adjusting mechanism 24.

The moving mechanism 23 comprises a rack 231 which has a stopper 2312 disposed at one end of it; a spindle 233 which is rotatably disposed on the combiner carrier 15, and a gear wheel 232 which is disposed on the spindle 233 and engaged with the rack 231. When the spindle 233 is rotated, the gear wheel 232 is rotated together with the shaft 233 and relatively moved on the rack 231, therefore, to move the combiner carrier 15 between the parking position and the operating position.

The driving mechanism 26 comprises a sleeve 261, a planetary gear train 262 and a guiding slot 263. The sleeve 261 is rotatably disposed on the spindle 233 and has a guiding plate 2611 and a bulge 2613. The guiding plate 2611 has a guiding pin 2612 which is accommodated in the guiding slot 263. The planetary gear train 262 comprises a sun gear 2621, a planet gear 2622 and a ring gear 2623. The sun gear 2621 is disposed on the spindle 233 and is rotated together with the spindle 233. The ring gear 2623 is rotatably disposed on the spindle 233 and is engaged with an endless gear belt 17. The endless gear belt 17 is driven by a motor 18 and, accordingly, drives the ring gear 2623 to rotate on the spindle 233. The planet gear 2622 is rotatably connected to the bulge 2613 and is engaged with the sun gear 2621 and the ring gear 2623. The guiding slot 263 comprises a straight slot 2631 and a curve slot 2632 for switching the motion types of the planetary gear train 262.

When the ring gear 2623 is driven by the motor 18 through the endless gear belt 17 to rotate on the spindle 233, the sun gear 2621 is able to rotate while the guiding pin 2612 is in the straight slot 2631, and the sun gear 2621 is unable to rotate while the gear wheel 232 arrives at the stopper 1312.

Moreover, when the ring gear 2623 is driven by the motor 18 through the gear belt 17 to rotate on the spindle 233, the planet gear 2622 is self-rotated at a fixed position while the guiding pin 2612 is restricted in the straight slot 2631, and the planet gear 2622 is revolved about the sun gear 2621 while the guiding pin 2612 arrives at the curve slot 2632.

The angle adjusting mechanism 24 comprises a cam 241 and a lever 242. The cam 241 is disposed on the sleeve 261 and is capable of rotating together with the sleeve 261. One end of the lever 242 is fixed on the combiner 11 and the other end is a free end which is pushed by the cam 241 while the cam 241 rotates. When the cam 241 is rotated together with the sleeve 261, the cam 241 pushes the free end of the lever 242 to rotate the combiner 11 for adjusting the tilt angle of the combiner 11.

Figure 7:
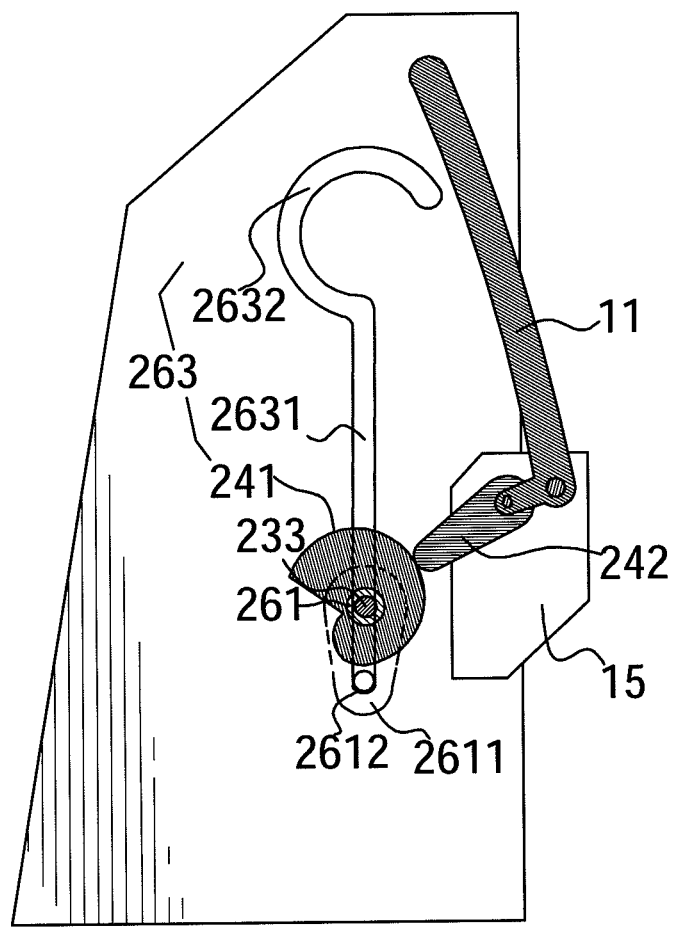
FIG. 7 is a side cross-section view of the positioning system in FIG. 5 wherein a combiner carrier is at a parking position.
Figure 8:
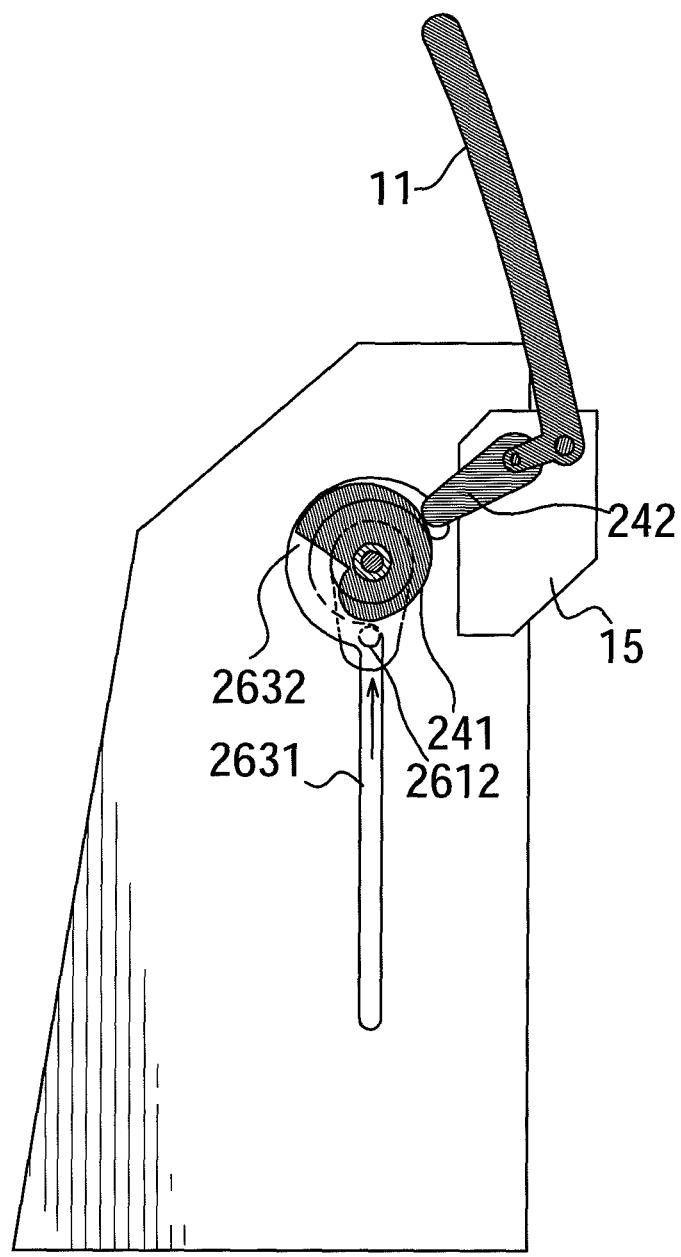
FIG. 8 is a side cross-section view of the positioning system in FIG. 5 wherein the combiner carrier is at an operating position.
Figure 9:
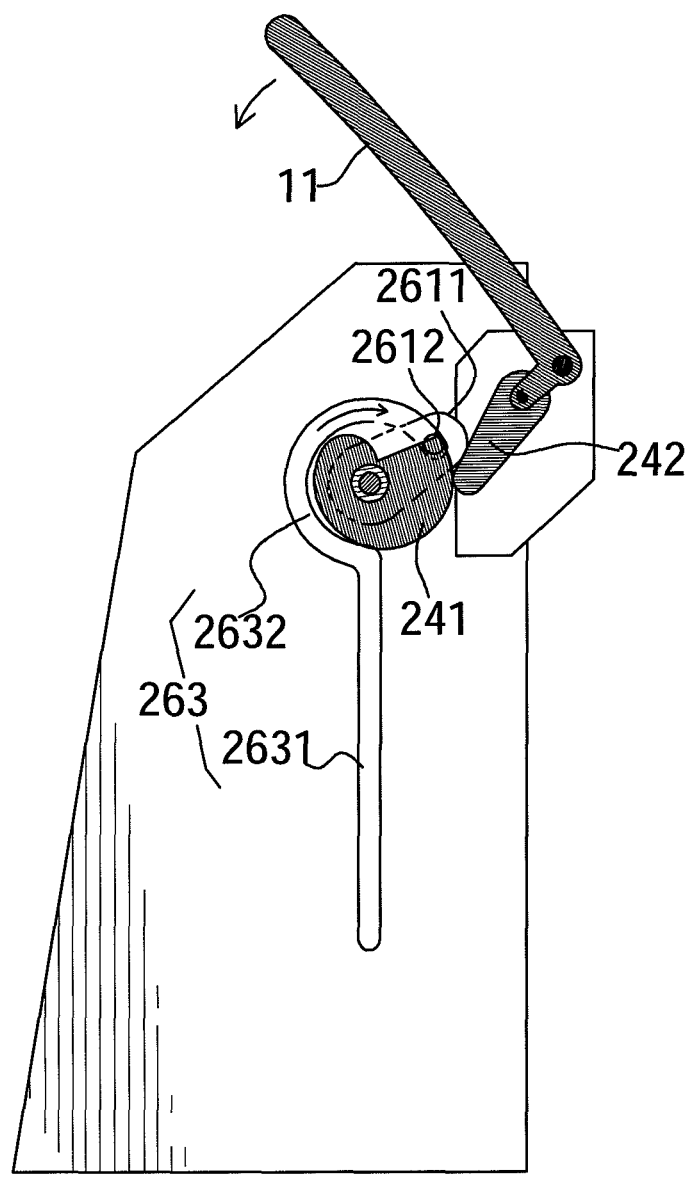
FIG. 9 is a side cross-section view of the positioning system in FIG. 5 wherein the tilt angle of a combiner is adjusted.

Please refer to FIGS. 6 to 9. FIGS. 7 to 9 are side cross-section views of the positioning system in FIG. 5 to respectively show that a combiner carrier is at a parking position, the combiner carrier is at an operating position, and the tilt angle of a combiner is adjusted.

The detailed description of the operation of the positioning system is described as follow.

Before starting to operate the positioning system 20, the combiner carrier 15 is positioned at the parking position, and the guiding pin 2612 is positioned at an end position of the straight slot 2631 as shown in FIG. 7.

When starting to operate the positioning system 20, the endless gear belt 17 is driven by the motor 18 and simultaneously drives the ring gear 2623 to rotate. At that time, as the rotation of the sleeve 261 is prohibited by the constraint between the guiding pin 2612 and the straight slot 2631, the planet gear 2622 is driven by the ring gear 2623 to self-rotate at a fixed position. Accordingly, the sun gear 2621 is driven by the planet gear 2622 to rotate, and the spindle 233 and the gear wheel 232 are simultaneously rotated. The rotation of the gear wheel 232 causes the relative movement of the gear wheel 232 on the rack 231 until the gear wheel 232 contacts the stopper 2312 and stops rotating because of the blocking of the stopper 2312.

During above operation, the combiner carrier 15 is moved from the sparking position to the operating position, and the guiding pin 2612 is moved in the straight slot 2631 from the end position to a boundary position between the straight slot 2631 and the curve slot 2632 as shown in FIG. 8.

Now please refer to FIG. 8. When the combiner carrier 15 moves to the operating position, the further rotation of the sun gear 2621, the spindle 233 and the gear wheel 232 is blocked by the stopper 2312. At that time, the rotation of the sleeve 261 is released because the guiding pin 2612 can move in the curve slot 2632 with the rotation of the sleeve 261. Accordingly, when the motor 18 keeps driving the ring gear 2623, the planet gear 2622 is revolved about the sun gear 2621.

When the planet gear 2622 is revolved about the sun gear 2621, the sleeve 261 and the cam 241 are driven to rotate together, and the cam 241 will contact and push the lever 242 as shown in FIG. 9. Due to the varying radius of the cam 241, the cam 241 pushes the lever 242 at varying distance to rotate the combiner 11, thereby, it could control the tilt angle of the combiner 11 at a suitable view angle for a viewer.

And then, if a user intends to move the combiner carrier 15 back to the parking position, the entire process is reverse by reversing the motor 18. First, the sleeve 261 is driven to reversely rotate until the guiding pin 2612 moves back to the boundary position between the straight slot 2631 and the curve slot 2632 as shown in FIG. 8. Then, the further rotation of the sleeve 261 is prohibited so that the sun gear 2621 is driven to reversely rotate. Therefore, the gear wheel 232 is rotated and moved on the rack 231 to carry the combiner carrier 15 back to the parking position as shown in FIG. 7.

By the way, as the same with the first embodiment, for recovering the lever 242 to its un-pushed position after releasing the pushing force from the cam 241, an elastic member such as a spring (not shown in the Figures) is provided on the lever 242 for providing an elastic force against the pushing force from the cam 241.

Figure 10:
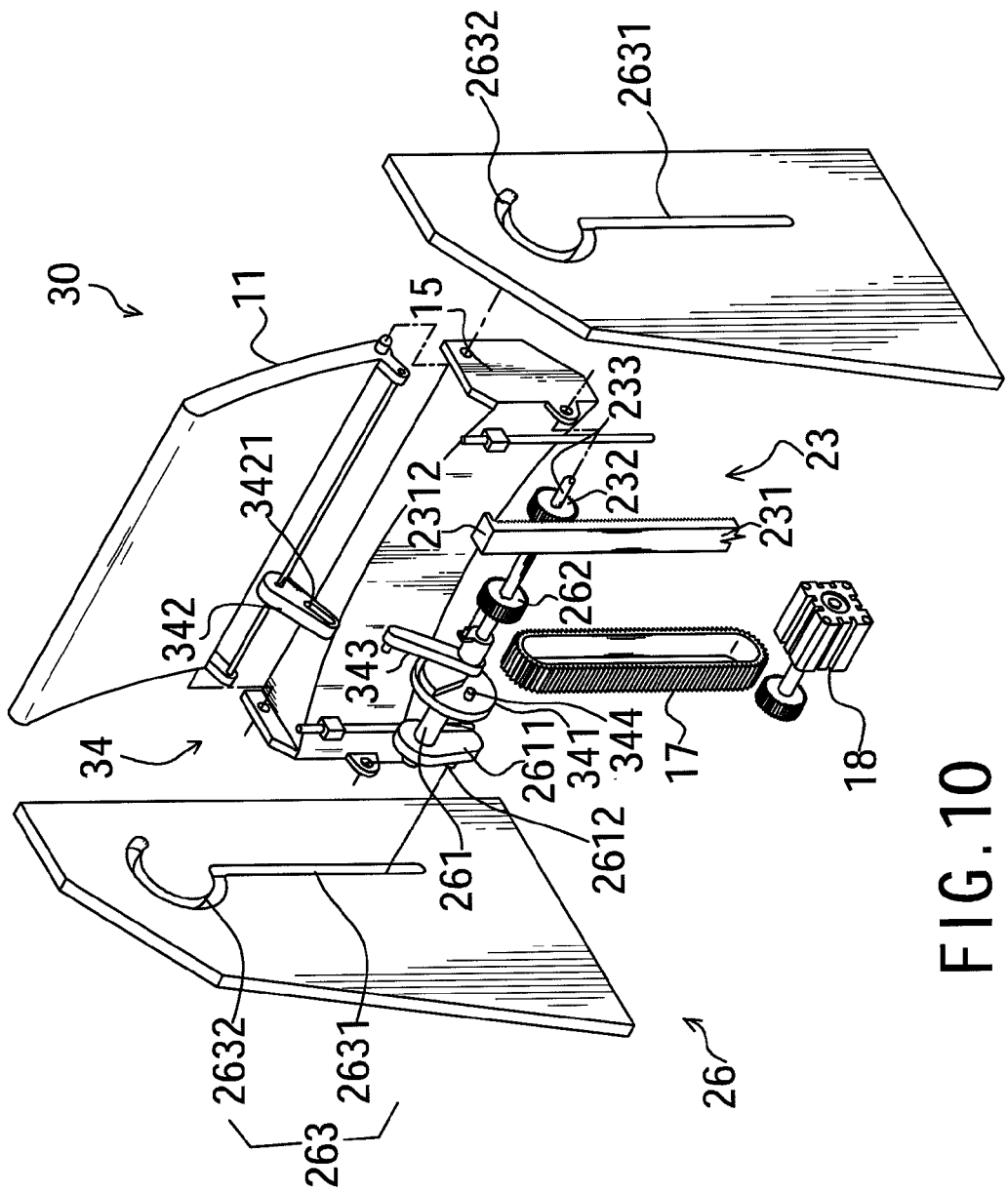
FIG. 10 is an explosion view of a third embodiment of a positioning system for a head-up display of the present invention.

Next, please refer to FIG. 10, which illustrates a third embodiment of a positioning system 30 for a head-up display of the present invention. In this embodiment, an alternative angle adjusting mechanism 34 is provided. The other members are the same as those illustrated in the first embodiment and are numbered with the same number, and their detailed illustration is omitted here. This embodiment is based on the second embodiment for illustration; however, the alternative angle adjusting mechanism 34 also can be implemented on the first embodiment for replacing the adjusting mechanism 14.

In the third embodiment, the angle adjusting mechanism 34 comprises a curved face cam 341, a main lever 342, and a service lever 343. The curved face cam 341 is disposed on the sleeve 261 and capable of rotating with the rotation of the sleeve 261. One end of the main lever 342 is fixed on the combiner 11, and the other end of the main lever 342 is a free end. Moreover, the main lever 342 has a guiding slot 3421 disposed on it. One end of the service lever 343 is moveably connected with the guiding slot 3421, and the other end of the service lever 343 is rotatably disposed on the sleeve 261. The curved face cam 341 has a pin 344 for pushing the service lever 343.

Please refer to FIGS. 10 to 14. FIGS. 11 to 14 are side cross-section views of the positioning system in FIG. 10 which respectively shows that a combiner carrier is at a parking position, the combiner carrier is at an operating position, the tilt angle of a combiner is adjusted, and the combiner is at a service position.

The operation of the moving mechanism 23 and the driving mechanism 26 according to the third embodiment are the same with the second embodiment.

Figure 11:
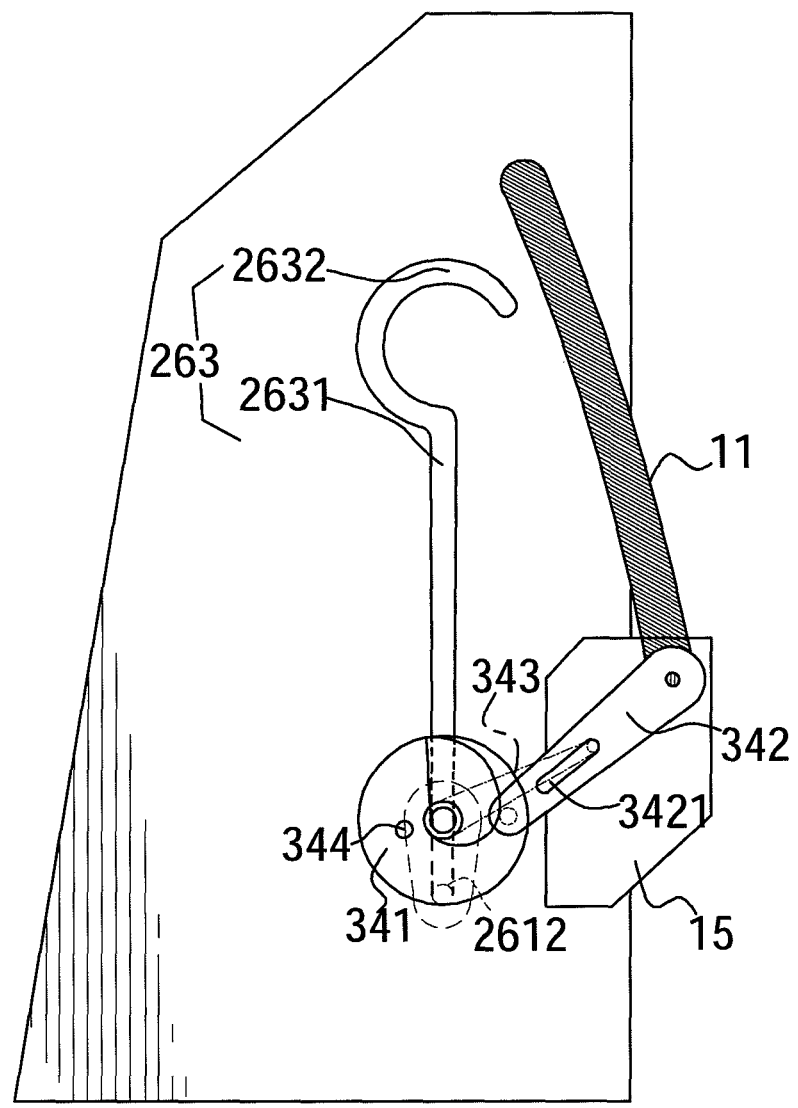
FIG. 11 is a side cross-section view of the positioning system in FIG. 10 wherein a combiner carrier is at a parking position.

Before starting to operate the positioning system 30, the combiner carrier 15 is positioned at the parking position, and the guiding pin 2612 is positioned at an end position of the straight slot 2631 as shown in FIG. 11.

When starting to operate the positioning system 20, the endless gear belt 17 is driven by the motor 18 and simultaneously drives the ring gear 2623 to rotate. At that time, as the rotation of the sleeve 261 is prohibited by the constraint between the guiding pin 2612 and the straight slot 2631, the planet gear 2622 is driven by the ring gear 2623 to self-rotate at a fixed position. Accordingly, the sun gear 2621 is driven by the planet gear 2622 to rotate, and the spindle 233 and the gear wheel 232 are simultaneously rotated. The rotation of the gear wheel 232 causes the relative movement of the gear wheel 232 on the rack 231 until the gear wheel 232 contacts the stopper 2312 and stops rotating because of the blocking of the stopper 2312.

During above operation, the combiner carrier 15 is moved from the sparking position to the operating position, and the guiding pin 2612 is moved in the straight slot 2631 from the end position to a boundary position between the straight slot 2631 and the curve slot 2632.

Figure 12:
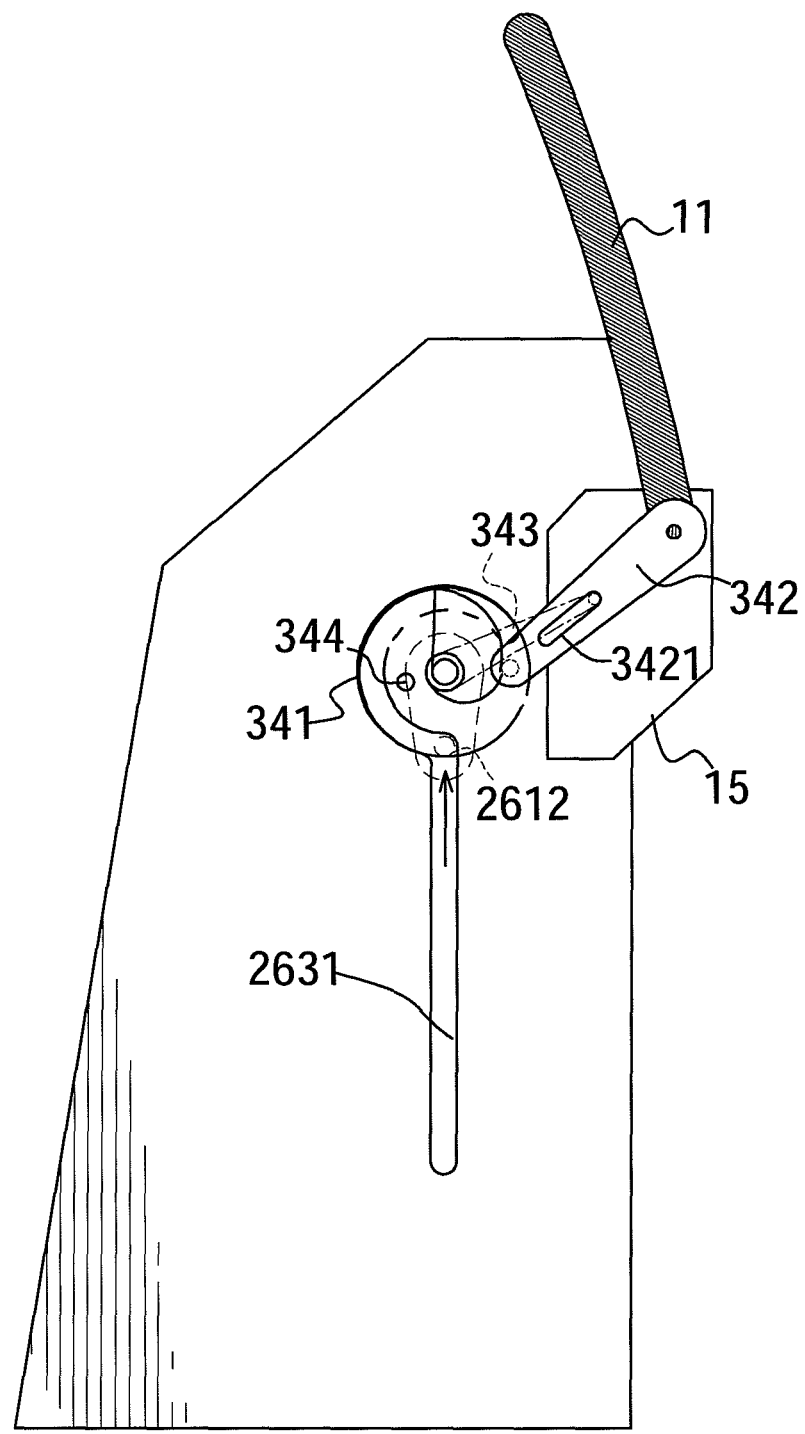
FIG. 12 is a side cross-section view of the positioning system in FIG. 10 wherein the combiner carrier is at an operating position.

Please refer to FIG. 12. When the combiner carrier 15 moves to the operating position, the further rotation of the sun gear 2621, the spindle 233 and the gear wheel 232 is blocked by the stopper 2312. At that time, the rotation of the sleeve 261 is released because the guiding pin 2612 can move in the curve slot 2632 with the rotation of the sleeve 261. Accordingly, when the motor 18 keeps driving the ring gear 2623, the planet gear 2622 is revolved about the sun gear 2621.

Figure 13:
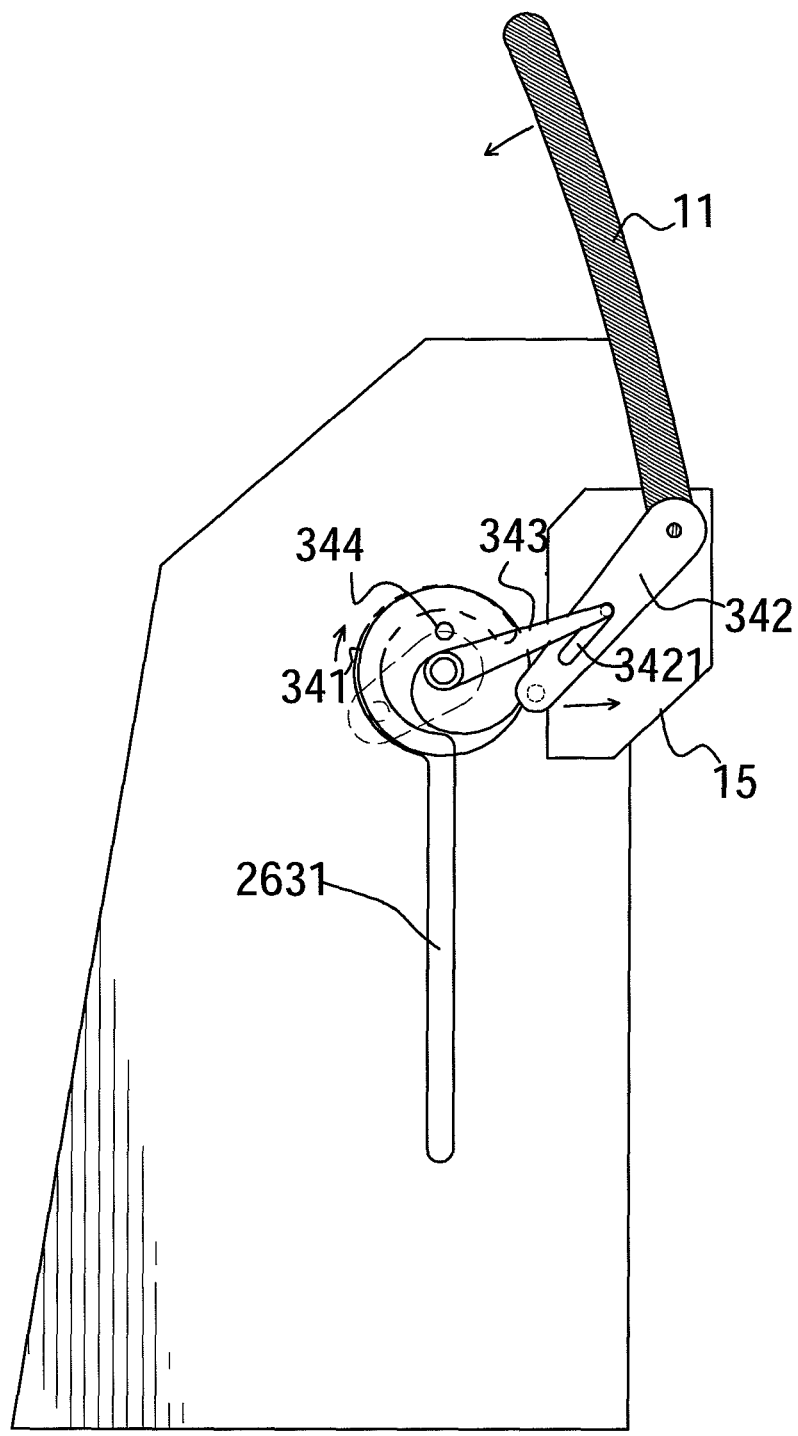
FIG. 13 is a side cross-section view of the positioning system in FIG. 10 wherein the tilt angle of a combiner is adjusted.

When the planet gear 2622 is revolved about the sun gear 2621, the sleeve 261 and the curved face cam 341 are driven to rotate together, and the curved face cam 341 will push and guide the main lever 342 to rotate the combiner 11 to fine adjust the tilt angle of the combiner 11 at a suitable view angle for a viewer as shown in FIG. 13.

Figure 14:
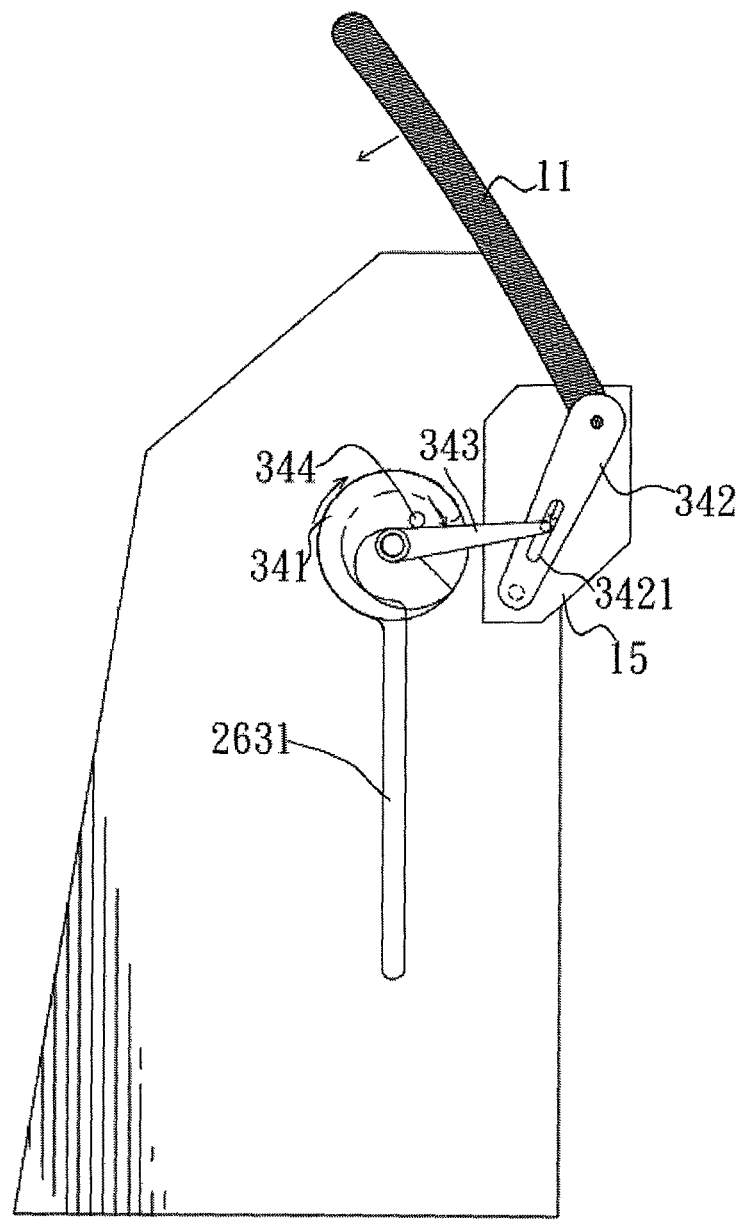
FIG. 14 is a side cross-section view of the positioning system in FIG. 10 wherein the combiner at a service position.

Besides, with the further rotation of the curved face cam 341, the pin 344 will press the service lever 343 to allow its one end moving in the guiding slot in the main lever and thus further push the main lever 342 to further rotate the tilt angle so that the combiner 11 is at a service position as shown in FIG. 14. At the service position, the combiner is far away from the windshield to have the possibility to clean the windshield behind the combiner.

Figure 15:
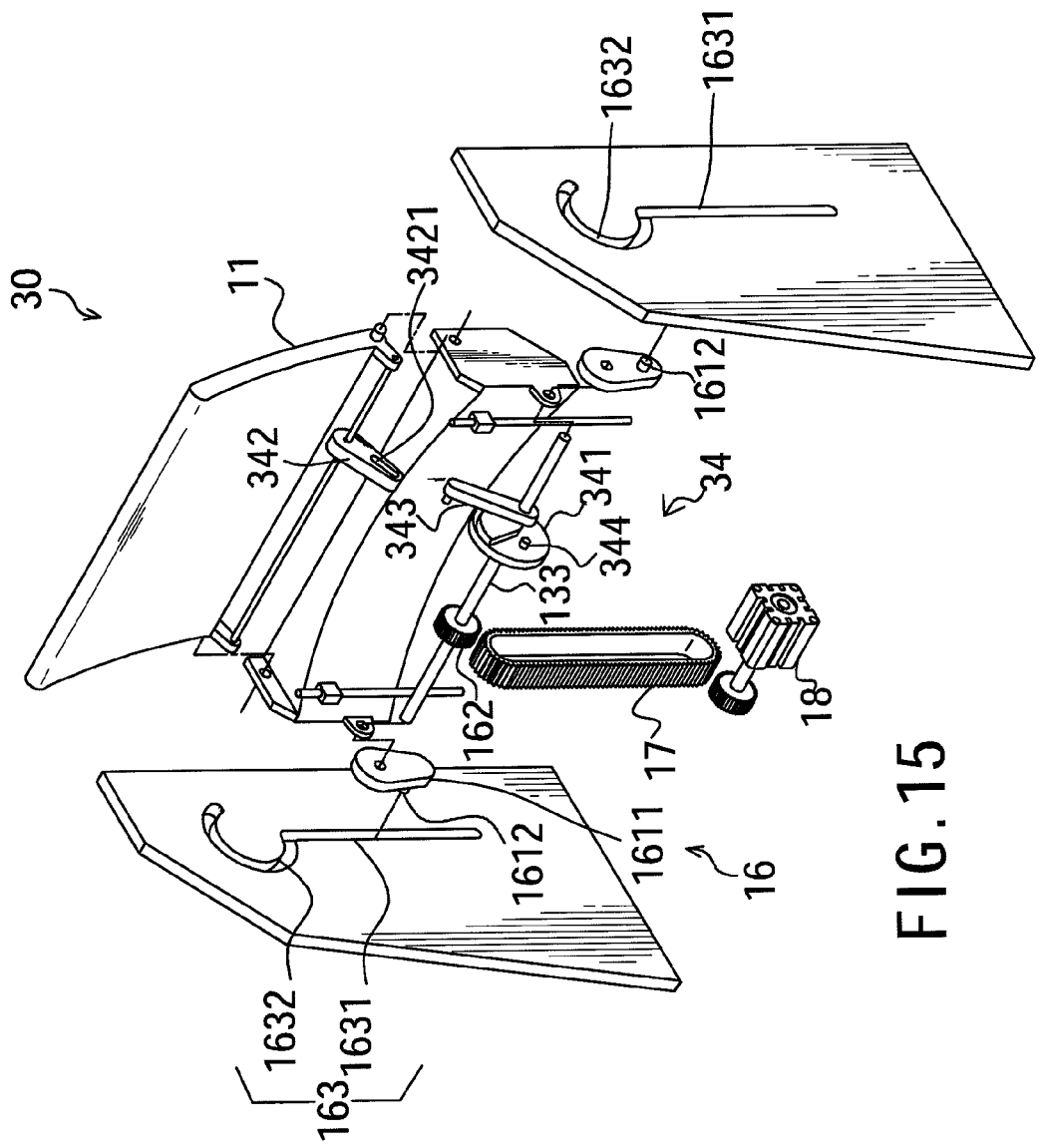
FIG. 15 is an explosion view of the third embodiment that is implemented in the first embodiment.

The alternative angle adjusting mechanism 34 also can be implemented on the first embodiment for replacing the adjusting mechanism 14 as shown in FIG. 15.

The angle adjusting mechanism 34 comprises a curved face cam 341, a main lever 342, and a service lever 343. The curved face cam 341 is disposed on the spindle 133 and capable of rotating with the rotation of the spindle 133. One end of the main lever 342 is fixed on the combiner 11, and the other end of the main lever 342 is a free end. Moreover, the main lever 342 has a guiding slot 3421 disposed on it. One end of the service lever 343 is moveably connected with the guiding slot 3421, and the other end of the service lever 343 is rotatably disposed on the spindle 133. The curved face cam 341 has a pin 344 for pushing the service lever 343.

The operation is the same as those illustrated in the first and the third embodiment, and the detailed description is omitted here.

According to the positioning system of the present invention, the moving mechanism and the angle adjusting mechanism are separate units, and the designs of them are flexible to change for fitting the requirements for dashboard and different windshields from car makers. Moreover, according to the driving mechanism provided in the present invention, the moving mechanism and the angle adjusting mechanism are alternatively driven without two their own driving mechanisms. Therefore, the size of the head-up display system is reduced.

While the present invention has been particularly shown and described with reference to exemplary embodiments thereof, it will be understood by those of ordinary skill in the art that various changes and modifications may be made therein without departing from the spirit and scope of the present invention as defined by the following claims.

What is claimed is:

1. A positioning system for a head-up display, which comprises:
a combiner carrier, being moved between a first position and a second position;
a combiner, rotatably disposed on the combiner carrier and a tilt angle of the combiner being adjusted, wherein the combiner is rotated relative to the combiner carrier when adjusting the tilt angle of the combiner; and
a driving mechanism for alternatively driving the movement of the combiner carrier and the tilt angle adjustment of the combiner,
wherein the driving mechanism comprises a guiding plate having a guiding pin; and a guiding slot for accommodating the guiding pin and having a straight slot and a curve slot;
wherein, when the guiding pin moves in the straight slot, the driving mechanism drives the movement of the combiner carrier;
wherein, when the guiding pin moves in the curve slot, the driving mechanism drives the tilt angle adjustment of the combiner, and the movement of the combiner carrier is stopped.

2. The positioning system for the head-up display according to claim 1 further comprising a spindle rotatably disposed on the combiner carrier; and a driving gear disposed on the spindle, wherein the guiding plate is disposed on the spindle,
wherein, when the guiding pin is in the straight slot, the spindle and the driving gear are prohibited from rotating, and the driving gear is driven to move linearly to drive the movement of the combiner carrier,
wherein, when the guiding pin is in the curve slot, the spindle and the driving gear are allowed to rotate, the driving gear is driven to rotate to drive the tilt angle adjustment of the combiner.

3. The positioning system for the head-up display according to claim 2, wherein the driving gear is driven by an endless gear belt.

4. The positioning system for the head-up display according to claim 1, wherein the driving mechanism further comprises:
a planetary gear train, having a sun gear and a planet gear, wherein the planet gear is engaged with the sun gear; and
a sleeve, connected to the planet gear and having the guiding pin;
wherein, when the guiding pin is in the straight slot, the planet gear is rotated at a fixed position and drives the sun gear to rotate to drive the movement of the combiner carrier,
wherein, wherein the guiding pin is in the curve slot, the planet gear is revolved about the sun gear to drive the tilt angle adjustment of the combiner, and the sun gear is prohibited to rotate.

5. The positioning system for the head-up display according to claim 4, further comprising a rack having a stopper at its one end; and a gear wheel disposed on the spindle and engaged with the rack; wherein, when the sun gear is driven to rotate, the gear wheel is rotated together and relatively moves on the rack to drive the movement of the combiner carrier.

6. The positioning system for the head-up display according to claim 5, wherein the guiding pin is in the curve slot, the rotation of the gear wheel is stopped by the stopper, and the sun gear is prohibited to rotate accordingly.

7. A positioning system for a head-up display, which comprises:
a combiner carrier, being moved between a first position and a second position;
a combiner, rotatably disposed on the combiner carrier and a tilt angle of the combiner being adjusted, wherein the combiner is rotated relative to the combiner carrier when adjusting the tilt angle of the combiner;
a spindle, rotatably disposed on the combiner carrier;
a driving gear, disposed on the spindle; and
a driving mechanism, comprising a guiding plate disposed on the spindle and having a guiding pin; and a guiding slot for accommodating the guiding pin and having a straight slot and a curve slot;
wherein, when the guiding pin is in the straight slot, the spindle and the driving gear are prohibited from rotating, and the driving gear is driven to move linearly to drive the movement of the combiner carrier, wherein, when the guiding pin is in the curve slot, the spindle is allowed to rotate, the spindle and the driving gear are allowed to rotate, and the driving gear is driven to rotate to drive the tilt angle adjustment of the combiner.

8. The positioning system for the head-up display according to claim 7, wherein the driving gear is driven by an endless gear belt.

9. A positioning system for a head-up display, which comprises:
- a combiner carrier, being moved between a first position and a second position;
- a combiner, rotatably disposed on the combiner carrier and a tilt angle of the combiner being adjusted, wherein the combiner is rotated relative to the combiner carrier when adjusting the tilt angle of the combiner; and
- a driving mechanism, comprising a planetary gear train having a sun gear and a planet gear; a sleeve connected to the planet gear and having a guiding pin; and a guiding slot for accommodating the guiding pin and having a straight slot and a curve slot;

wherein, when the guiding pin is in the straight slot, the planet gear is rotated at a fixed position and drives the sun gear to rotate to drive the movement of the combiner carrier, wherein, wherein the guiding pin is in the curve slot, the planet gear is revolved about the sun gear to drive the tilt angle adjustment of the combiner, and the sun gear is prohibited to rotate.

10. The positioning system for the head-up display according to claim 9 further comprising a rack having a stopper at its one end; and a gear wheel disposed on the spindle and engaged with the rack; wherein, when the sun gear is driven to rotate, the gear wheel is rotated together and relatively moves on the rack to drive the movement of the combiner carrier.

11. The positioning system for the head-up display according to claim 10, wherein the guiding pin is in the curve slot, the rotation of the gear wheel is stopped by the stopper, and the sun gear is prohibited to rotate accordingly.

* * * * *